(12) United States Patent
Accapadi et al.

(10) Patent No.: US 8,489,824 B2
(45) Date of Patent: Jul. 16, 2013

(54) SELECTIVE MEMORY COMPRESSION FOR MULTI-THREADED APPLICATIONS

(75) Inventors: Mathew Accapadi, Austin, TX (US); Grover Cleveland Davidson, II, Austin, TX (US); Dirk Michel, Austin, TX (US); Bret Ronald Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 12/885,743

(22) Filed: Sep. 20, 2010

(65) Prior Publication Data
US 2012/0072676 A1    Mar. 22, 2012

(51) Int. Cl.
G06F 12/00    (2006.01)
(52) U.S. Cl.
USPC ........................................ 711/147
(58) Field of Classification Search
None
See application file for complete search history.

(56) References Cited

U.S. PATENT DOCUMENTS

| 5,794,228 | A | 8/1998 | French et al. |
| 6,145,069 | A | 11/2000 | Dye et al. |
| 7,587,572 | B1 * | 9/2009 | Stenstrom .................... 711/173 |
| 7,702,875 | B1 | 4/2010 | Ekman et al. |

OTHER PUBLICATIONS

Beltran-et al.; "Imprving Web server performance throuigh main memory compression"; INSPEC/IEEE; pp. 303-310; 2008.
Sundaram-et al.; "Efficient Fault Tolerance in Multi-Media Applications through Selective Instruction Replication"; ACM Digital Library: pp. 339-349; May 2008.
Reddy-et al.; "Cache partitioning for energy-efficient and interference-free embedded multitasking"; ACM Digital Library; vol. 9, Issue 3, Article 16; Feb. 2010.

* cited by examiner

*Primary Examiner* — Hiep Nguyen
(74) *Attorney, Agent, or Firm* — Garg Law Firm, PLLC; Rakesh Garg; Libby Z. Toub

(57) ABSTRACT

A method, system, and computer usable program product for selective memory compression for multi-threaded applications are provided in the illustrative embodiments. An identification of a memory region that is shared by a plurality of threads in an application is received at a first entity in a data processing system. A request for a second entity in the data processing system to keep the memory region uncompressed when compressing at least one of a plurality of memory regions that comprise the memory region is provided from the first entity to the second entity.

20 Claims, 6 Drawing Sheets

SELECTIVE MEMORY COMPRESSION FOR MULTI-THREADED APPLICATIONS

BACKGROUND OF THE INVENTION

1. Field of the Invention

The present invention relates generally to an improved data processing system, and in particular, to a computer implemented method for selective memory compression. More particularly, the present invention relates to a computer implemented method, system, and computer usable program code for selective memory compression for multi-threaded applications in a data processing environment.

2. Description of the Related Art

The performance of a data processing system may be limited by the system's memory, which may prevent the system from taking advantage of system resources. Memory compression techniques are used to increment a data processing system's available memory and thereby allow the system to improve the use of system resources.

Generally, a compressed memory system is based on the reservation of some physical memory to store compressed data, virtually increasing the amount of memory available to the system's computer program applications. The number of retrieval requests sent to a relatively slow hardware device may be reduced if information retrieved from a previous request to the device is stored in the extra memory, thereby saving time that would have been required for the additional retrieval requests. Furthermore, this extra memory may allow the execution of applications with larger memory requirements.

A memory compression system may rely on maintaining two pools of memory, an uncompressed pool of memory and a compressed pool of memory. According to one currently used method, a data processing system's operating system may select a memory region that has been least recently used, compress this selected memory region's data, and move this compressed data to the compressed pool of memory. When a memory region that has had the region's data compressed is subsequently accessed, the operating system may decompress the compressed memory region's data that is stored in the compressed pool of memory, and move the decompressed data back to the uncompressed pool of memory. Time delays for a memory compression system may not be noticeable because the latency to decompress any compressed data is relatively small, and limited mostly by the speed of the data processing system's central processing unit(s).

However, a memory compression system may face challenges in selecting the best memory region for compression. A memory region is typically selected for compression based on the most recent access to the memory region. Sometimes such selections for compression result in no noticeable adverse consequences for the data processing system, but sometimes such selections for compression result in adverse consequences for the data processing system. When memory regions are poorly selected for compression, an application using the memory region selected for compression may experience delays, performance deterioration, and even error conditions. Overall data processing system's performance may suffer from high central processing unit overheads and adverse impacts on system response times.

SUMMARY OF THE INVENTION

The illustrative embodiments provide a method, system, and computer usable program product for selective memory compression for multi-threaded applications. An embodiment receives, at a first entity in a data processing system, an identification of a memory region that is shared by a plurality of threads in an application. The embodiment provides, from the first entity to a second entity in the data processing system, a request for the second entity to keep the memory region uncompressed when compressing at least one of a plurality of memory regions that comprise the memory region.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Many computer program applications include multiple threads of execution. A thread of execution, or a thread, is the smallest unit of processing that can be scheduled by an operating system. A thread generally results from a fork of a computer application program into two or more concurrently running tasks. Multiple threads within the same application can share resources, such as memory and the values that the application's variables have at any given moment. Each thread in an application may be allocated a memory region that is dedicated to that thread. Many of these same threads may also share access to a common memory region.

The invention recognizes that although an application may monitor the memory regions allocated to each of the regions' threads individually and collectively, an operating system, or generally any memory management subsystem, may have limited knowledge of the relationships between each of an application's threads and their associated memory regions. Using an operating system as an example, the operating system may select a memory region's data for compression because the memory region was not accessed recently by a thread in an application. However, another thread in the application may use the same memory region to store or read data, such as access locks for a relational database. In such a situation, the operating system's selection of the shared memory region for compression may result in unnecessary delays when another thread in the application has to wait for the decompression of the data that was stored in the shared memory region.

Illustrative embodiments of the invention provide a method, computer usable program product, and data processing system for selective memory compression for multi-threaded applications for addressing and solving such problems and other memory compression problems. Illustrative embodiments identify memory regions that are shared by multiple threads in an application and request that such identified memory regions are kept uncompressed when memory regions are selected for compression.

In one embodiment, such a request may be handled as a low priority request that may be overridden by a conflicting memory compression rule that selects the identified memory region for compression. In another embodiment, such a request may be handled as a high priority or privileged request that may override a conflicting memory compression rule that selects the identified memory region for compression. Illustrative embodiments of the invention may reduce contention issues experienced by incidental compression of shared data that is important to multiple threads.

The illustrative embodiments are described with respect to data, data structures, and identifiers only as examples. Such descriptions are not intended to be limiting on the invention. For example, an illustrative embodiment described with respect to a single piece of information may be implemented using a combination of several pieces of information, in a similar manner within the scope of the invention.

Furthermore, the illustrative embodiments may be implemented with respect to any type of data processing system. For example, an illustrative embodiment described with respect to a single-processor standalone data processing system may be implemented in a multiprocessor logical partition system within the scope of the invention. As another example, an embodiment of the invention may be implemented with respect to any type of client system, server system, platform, or a combination thereof.

The illustrative embodiments are further described with respect to certain parameters, attributes, and configurations only as examples. Such descriptions are not intended to be limiting on the invention. For example, an illustrative embodiment described with respect to parameterized interface may accept any type of parameter, or a parameterized interface or communication may be replaced by a non-parameterized communication numeric attribute may be implemented using an alphanumeric attribute, a symbolic attribute, or a combination thereof, in a similar manner within the scope of the invention.

An application implementing an embodiment may take the form of data objects, code objects, encapsulated instructions, application fragments, drivers, routines, services, systems—including basic I/O system (BIOS), and other types of software implementations available in a data processing environment. For example, Java® Virtual Machine (JVM®), Java® object, an Enterprise Java Bean (EJB®), a servlet, or an applet may be manifestations of an application with respect to which, within which, or using which, the invention may be implemented. (Java, JVM, EJB, and other Java related terminologies are registered trademarks of Sun Microsystems, Inc. or Oracle Corporation in the United States and other countries.)

An illustrative embodiment may be implemented in hardware, software, or a combination thereof. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

The illustrative embodiments are described using specific code, data structures, file systems, designs, architectures, layouts, schematics, and tools only as examples and are not limiting on the illustrative embodiments. Furthermore, the illustrative embodiments are described in some instances using particular data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 1:
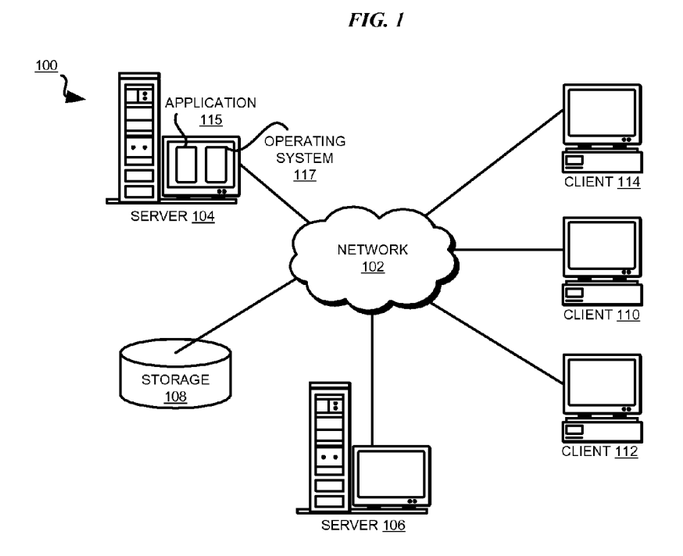
FIG. 1 depicts a pictorial representation of a network of data processing systems in which the illustrative embodiments may be implemented.
Figure 2:
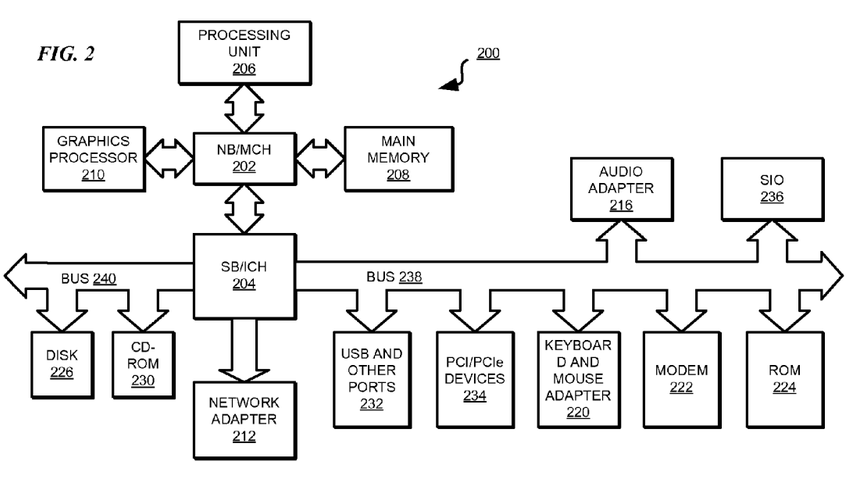
FIG. 2 depicts a block diagram of a data processing system in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon. Server 104, server 106, client 110, client 112, and/or client 114 may individually or collectively implement illustrative embodiments for selective memory compression for multi-threaded applications. For example, server 104 includes application 115, which is a multi-threaded application, and operating system 117, which selectively compresses memory in server 104 based on the memory usage of application 115.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations. In some configurations, processing unit 206 may include NB/MCH 202 or parts thereof.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). In some configurations, ROM 224 may be an Electrically Erasable Programmable Read-Only Memory (EEPROM) or any other similarly usable device. Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc. or Oracle Corporation, in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
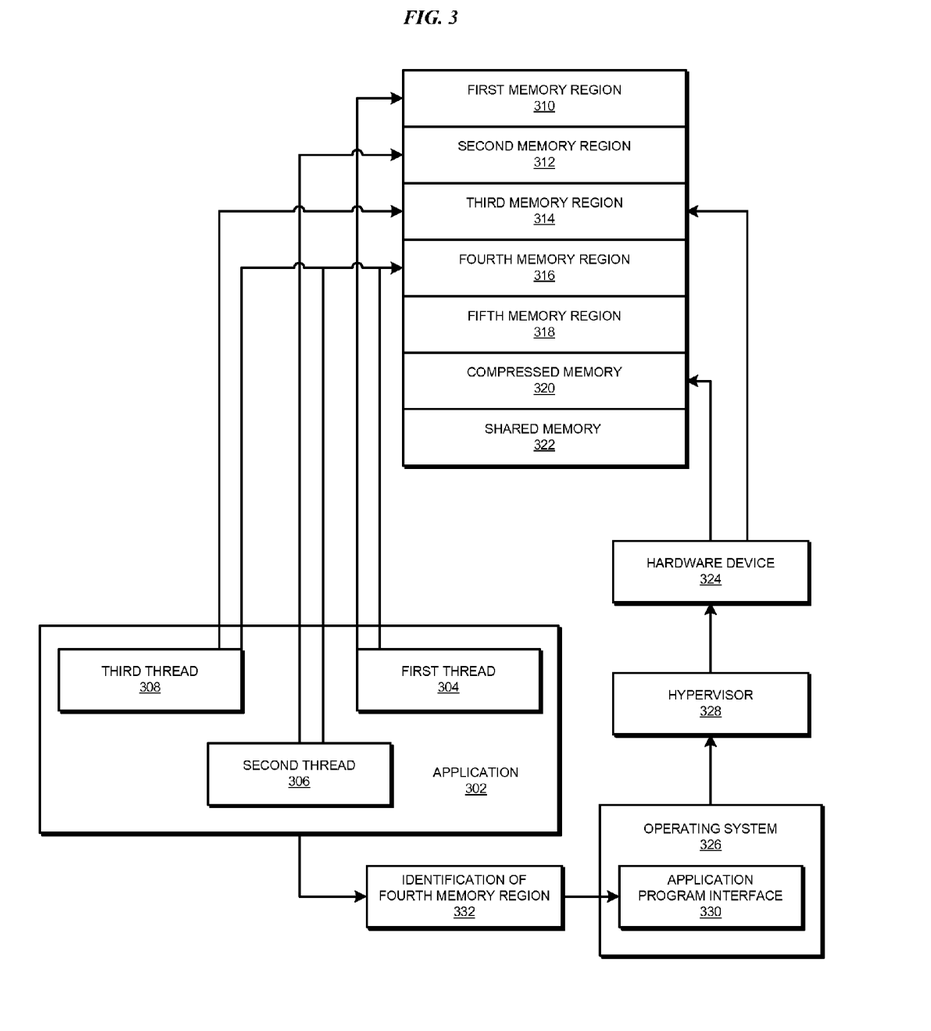
FIG. 3 depicts a block diagram of an example data processing system with respect to which an illustrative embodiment may be implemented.

With reference to FIG. 3, this figure depicts a block diagram of an example data processing system 300 with respect to which an illustrative embodiment may be implemented. Application 302 may be any application executable in a data processing system, and is similar to application 115 in FIG. 1. Application 302 may include first thread 304, second thread 306, and third thread 308. Threads 304-308 may be units of processing suitable for execution as part of application 302. Generally, any application with multiple threads according to an embodiment described herein may be represented by application 302 within the scope of the invention.

Application 302 and threads 304-308 may execute and use memory, such as first memory region 310, second memory region 312, third memory region 314, fourth memory region 316, fifth memory region 318, compressed memory 320, and shared memory 322. Memory regions 310-318 may be partitioned based on pages, blocks, sections, or any other type of division between portions of memory. Compressed memory 320 may store information in a compressed form that had previously been stored in any of the memory components 310-318. Shared memory 322 is memory that may be mutually accessible by multiple entities. Memory elements 310-322 may be a part or component of a data processing system, and may be implemented by main memory 208 in FIG. 2.

Data processing system 300 includes hardware device 324, such as a memory controller, a graphics controller, or any other suitable hardware component of data processing system 300, and operating system 326, which is similar to operating system 117 in FIG. 1. Operating system 326 may facilitate communication between hardware or software components of data processing system 300, such as between application 302 and hardware device 324. Data processing system 300 may optionally include hypervisor 328. Operating system 326 may also optionally include application program interface 330 to enable applications, such as application 302, to communicate with operating system 326.

Application 302 may monitor memory regions 310-318 that are allocated to threads 304-308, such as first memory region 310 allocated to first thread 304, second memory region 312 allocated to second thread 306, and third memory region 314 allocated to third thread 308. Furthermore, application 302 may also monitor that fourth memory region 316 is a common memory region that is allocated to first thread 304, second thread 306, and third thread 308. For example, fourth memory region 316 may store data access locks that are used by threads 304-308 to regulate their access to data in a relational database. Although data access locks are used for this example, a shared memory region may store any other type of shared data, such as counters or shared code.

If operating system 326 has no knowledge of the associations between threads 304-308 and memory regions 310-318, operating system 326 may select fourth memory region 316 for compression. Operating system 326 may select fourth memory region 316 for compression because fourth memory region 316 has not been recently accessed whereas memory regions 310-314 and 318 have each been recently accessed by threads 304-308 and another application, respectively. Operating system 326 may select a memory region for compression based on an indicator, which a component of operating system 326 sets when the memory region is accessed or modified, but the frequent clearing of such an indicator by operating system 326 may lead to a poor selection of a memory region for compression. Selecting to compress fourth memory session 316 may be a poor selection in this example situation because a thread from threads 304-308 may be accessing fourth memory section 316 such as when that thread is finished executing in memory regions 310-314. Therefore, the selection to compress fourth memory session 316 may result in delays for any or all of threads 304-308 while they wait for operating system 326 to decompress the data that had been stored in fourth memory region 316.

An illustrative embodiment of the invention addresses and solves such a problem. Application 302 may identify that fourth memory region 316 is shared by threads 304-308, and may identify that each of memory regions 310-314 are allocated to only one thread of threads 304-308. For example, application 302 may identify a memory region as shared by multiple threads by setting an indicator associated with that memory region, which differentiates the memory region from other memory regions for which the application does not set an associated indicator. Alternatively, application 302 can specify the number of threads that share each memory region. Application 302 may provide identification of fourth memory region 332 as a memory region shared by multiple threads to operating system 326, such as by invoking application program interface 330. Application program interface 330 may, for example, cause a function to execute that requests operating system 326 to keep fourth memory region 316 uncompressed when compressing at least one of the memory regions 310-318.

Operating system 326 may handle such a request in a variety of ways within the scope of the invention. For example, in one embodiment, operating system 326 may optionally determine whether a memory compression rule conflicts with the request to keep the identified memory region uncompressed when compressing at least one of the memory regions 310-318. For example, the access of fifth memory region 318 by another application may result in a memory compression rule selecting fourth memory region 316 for compression because fourth memory region 316 is the memory region with the longest time period since the most recent access to that region. If operating system 326 determines that a memory compression rule does not conflict with the request to keep the identified memory region uncompressed, operating system 326 may keep the identified memory region uncompressed when compressing one or more of the memory regions 310-318. If operating system 326 determines that the memory compression rule conflicts with the request to keep the identified memory region uncompressed, operating system 326 may optionally determine whether the request to keep the identified memory region uncompressed is a privileged request.

In another embodiment, if the request to keep the identified memory region uncompressed is a privileged request, in other words, a request that the operating system, a memory management subsystem, or a component is bound to honor, operating system 326 keeps the identified memory region uncompressed when compressing a region in memory regions 310-318. If the request to keep the identified memory region uncompressed is not a privileged request, operating system 326 may or may not compress the identified memory region, such as fourth memory region 316, depending on other conditions for memory compression.

Operating system 326 may convey a selection of a memory region to compress to hypervisor 328, which may convey the selection to hardware device 324, which may compress the selected memory region. Alternatively, if data processing system 300 does not include hypervisor 328, operating system 326 may convey the selection of a memory region to compress to hardware device 324, which may compress the selected memory region. For example, hardware device 324 compresses third memory region 314 because the request to keep fourth memory region 316 uncompressed is based on the allocation of third memory region 314 to only one thread, third thread 308, whereas fourth memory region 316 is shared by all threads 304-308.

Operating system 326 may access information regarding the dispatch, or activation, and un-dispatch, or deactivation, of threads 304-308. If a thread, such as third thread 308, has been un-dispatched for a longer period of time than other threads, such as threads 304-306, operating system 326 may select to compress any memory region(s) allocated to only that thread, such as third memory region 314 allocated to only third thread 308.

In this example, compression of third memory region 314 may be less likely to result in higher central processing unit costs and adverse impacts on response time than compression of fourth memory region 316. Furthermore, when a thread which has had data compressed, such as third thread 308, is subsequently made runnable, or prepared for execution, steps to uncompress the compressed data for that thread may begin before that thread is dispatched, or in parallel with beginning the execution of that thread. This combination of processes may accelerate the decompression of data for memory regions 310-318.

The examples of elements 302-332 are not intended to be limiting on the invention. Many other elements and combinations of elements 302-332 will be apparent to those of ordinary skill in the art and the same are contemplated within the scope of the invention. The operations are described with respect to an operating system only as an example for the clarity of the description and such description is not intended to be limiting on the invention. Similar operations may be implemented as modifications to an existing operating system or another component that is responsible for memory management or compression in a given data processing system within the scope of the invention.

Figure 4:
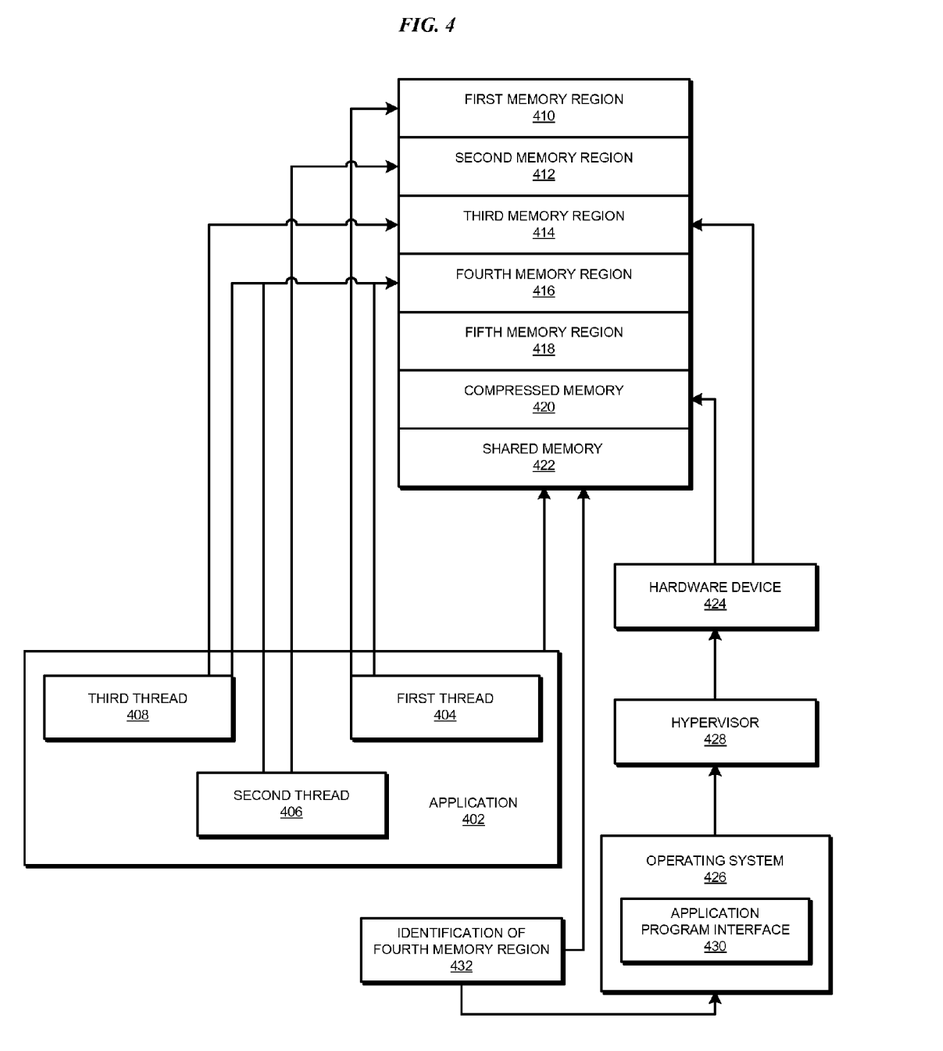
FIG. 4 depicts a block diagram of another example data processing system in accordance with an illustrative embodiment.

With reference to FIG. 4, this figure depicts a block diagram of another example data processing system 400 with respect to which an illustrative embodiment may be implemented. Elements 402-432 are similar to elements 302-332 in FIG. 3. Application 402 may provide identification of fourth memory region 432 as being a memory region shared by multiple threads to shared memory region 422. This manner of communicating the identification of fourth memory region 432 may be used, for example, when application program interface 430 in operating system 426 may not accept parameters or application program interface 430 is absent. Operating system 426 may monitor or reference shared memory 422 to receive identification of fourth memory region 432. Operating system 426 may handle receipt of this identification of fourth memory region 432 as a request to keep fourth memory region 416 uncompressed when compressing at least one of the memory regions 410-418.

Similar to operating system 326 in FIG. 3, operating system 426 may optionally determine whether a memory compression rule conflicts with the request to keep the identified memory region uncompressed when compressing at least one of the memory regions 410-418. Also similar to operating system 326 in FIG. 3, operating system 426 may optionally determine whether the request to keep the identified memory region uncompressed is a privileged request.

Operating system 426 may convey a selection of a memory region to compress to hypervisor 428, which may convey the selection to hardware device 424, which may compress the selected memory region. Alternatively, if data processing system 400 does not include hypervisor 428, operating system 426 may convey a selection of a memory region to compress to hardware device 424, which may compress the selected memory region. Similar to the example of hardware device 324 in FIG. 3, hardware device 424 may compress third memory region 414 because the request to keep fourth memory region 416 uncompressed is based on the allocation of third memory region 414 to only one thread, third thread 408, whereas fourth memory region 316 is shared by all threads 404-408.

Similar to operating system 326 in FIG. 3, operating system 426 may access information regarding the dispatch and un-dispatch of threads 404-408. If third thread 408 has been un-dispatched for a longer period of time than threads 404-406, operating system 426 may select to compress third memory region 414 allocated to only third thread 408.

In this example, compression of third memory region 414 may be less likely to result in higher central processing unit costs and adverse impacts on response time than compression of fourth memory region 416. Furthermore, when third thread 408 is subsequently made runnable, steps to uncompress the compressed data for third thread 408 may begin before third thread 408 is dispatched, or in parallel with beginning the execution of third thread 408. This combination of processes may accelerate the decompression of data for memory regions 410-418.

Figure 5:
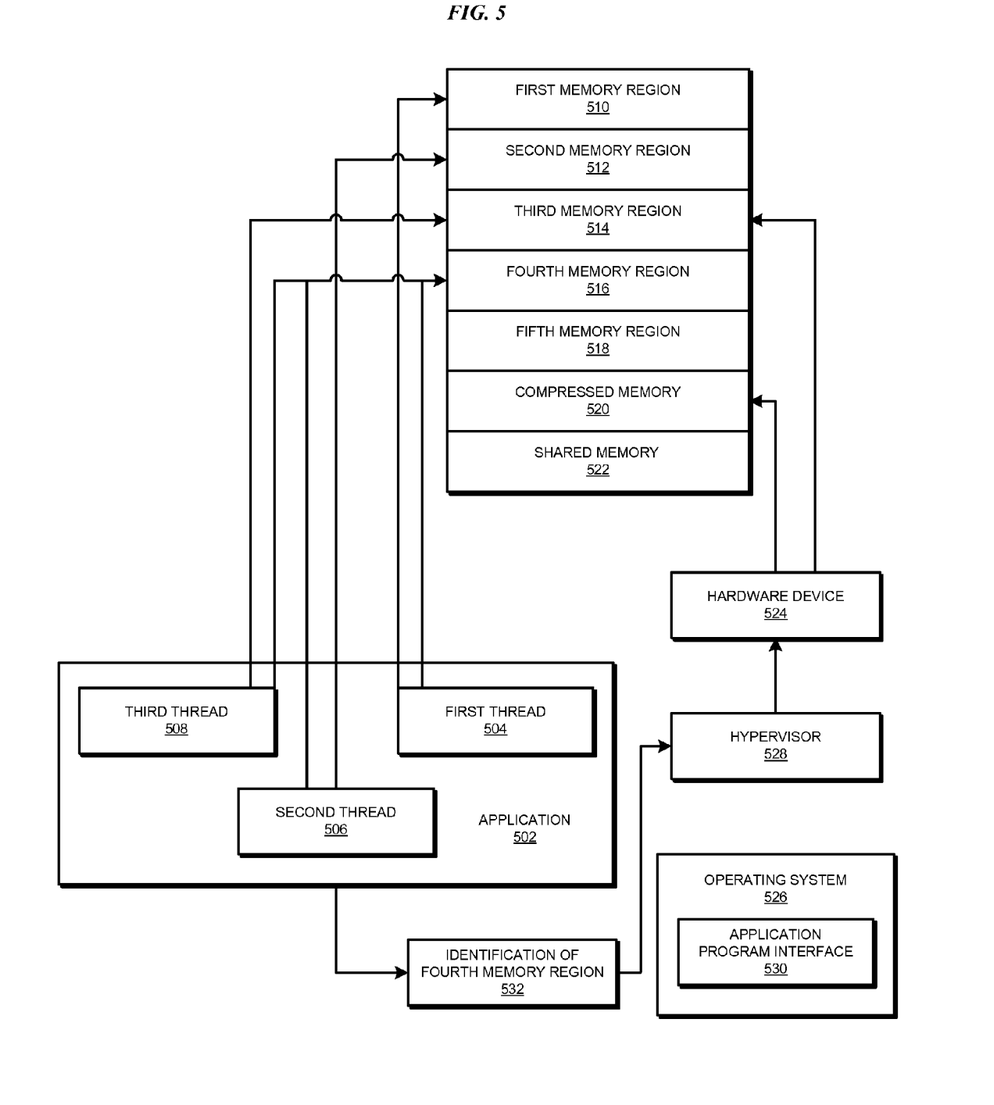
FIG. 5 depicts a block diagram of yet another example data processing system in accordance with an illustrative embodiment.

With reference to FIG. 5, this figure depicts a block diagram of yet another example data processing system 500 with respect to which an illustrative embodiment may be implemented. Elements 502-532 are similar to elements 302-332 in FIG. 3. Application 502 may provide identification of fourth memory region 532 as a memory region shared by multiple threads to hypervisor 528. Hypervisor 528 may handle receipt of this identification of fourth memory region 532 as a request to keep fourth memory region 516 uncompressed when compressing at least one of the memory regions 510-518.

Similar to operating system 326 in FIG. 3, hypervisor 528 may optionally determine whether a memory compression rule conflicts with the request to keep the identified memory region uncompressed when compressing at least one of the memory regions 510-518. Also similar to operating system 326 in FIG. 3, hypervisor 528 may optionally determine whether the request to keep the identified memory region uncompressed is a privileged request.

Hypervisor 528 may convey a selection of a memory region to compress to hardware device 524, which may compress the selected memory region. Similar to the example of hardware device 324 in FIG. 3, hardware device 524 may compress third memory region 514 because the request to keep fourth memory region 516 uncompressed is based on the allocation of third memory region 514 to only one thread, third thread 508, whereas fourth memory region 316 is shared by all threads 504-508. In this example, compression of third memory region 514 may be less likely to result in higher central processing unit costs and adverse impacts on response time than compression of fourth memory region 516.

Figure 6:
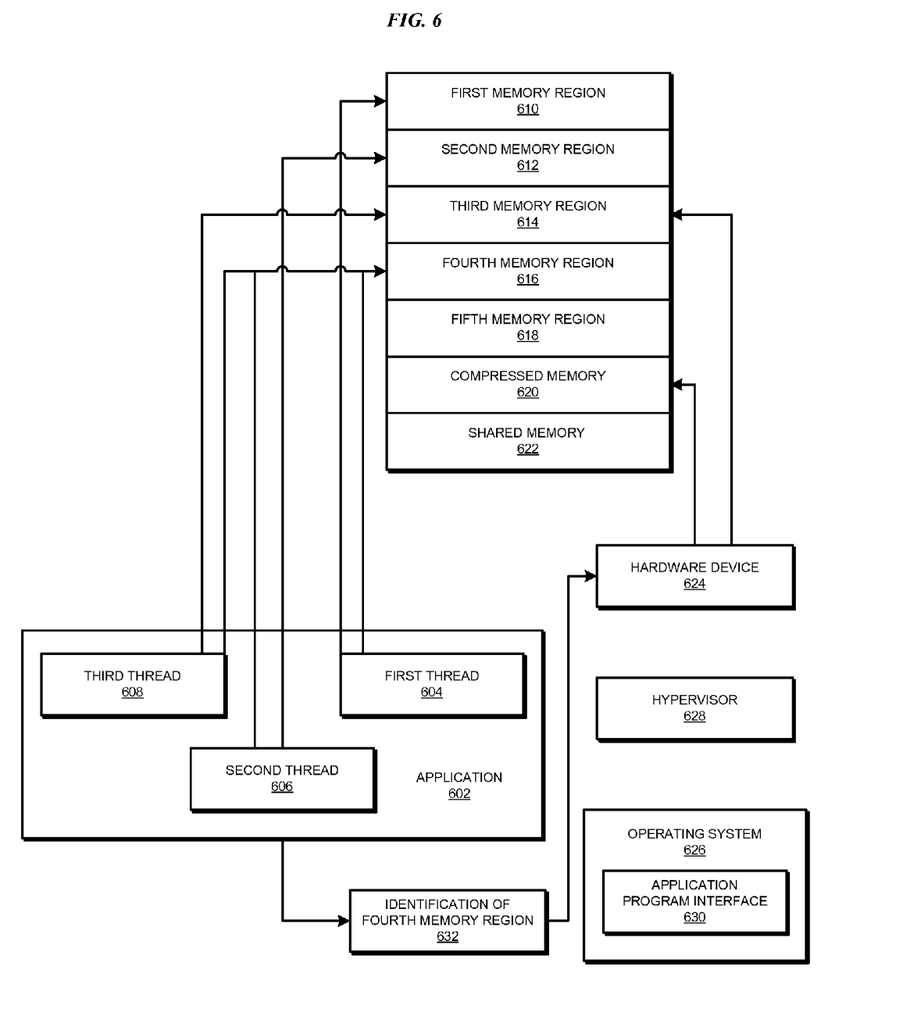
FIG. 6 depicts a block diagram of a further example data processing system in accordance with an illustrative embodiment.

With reference to FIG. 6, this figure depicts a block diagram of yet another example data processing system 600 with respect to which an illustrative embodiment may be implemented. Elements 602-632 are similar to elements 302-332 in FIG. 3. Application 602 may provide identification of fourth memory region 632 as a memory region shared by multiple threads to hardware device 624. Hardware device 624 may receive this information via a controller and/or registers, and handle receipt of this identification of fourth memory region 632 as a request to keep fourth memory region 616 uncompressed when compressing at least one of the memory regions 610-618.

Similar to operating system 326 in FIG. 3, hardware device 624 may optionally determine whether a memory compression rule conflicts with the request to keep the identified memory region uncompressed when compressing at least one of the memory regions 610-618. Also similar to operating system 326 in FIG. 3, hardware device 624 may optionally determine whether the request to keep the identified memory region uncompressed is a privileged request.

Hardware device 624 may compress the selected memory region. Similar to the example of hardware device 324 in FIG. 3, hardware device 624 may compress third memory region 614 because the request to keep fourth memory region 616 uncompressed is based on the allocation of third memory region 614 to only one thread, third thread 608, whereas fourth memory region 616 is shared by all threads 604-608. In this example, compression of third memory region 614 may be less likely to result in higher central processing unit costs and adverse impacts on response time than compression of fourth memory region 616.

Figure 7:
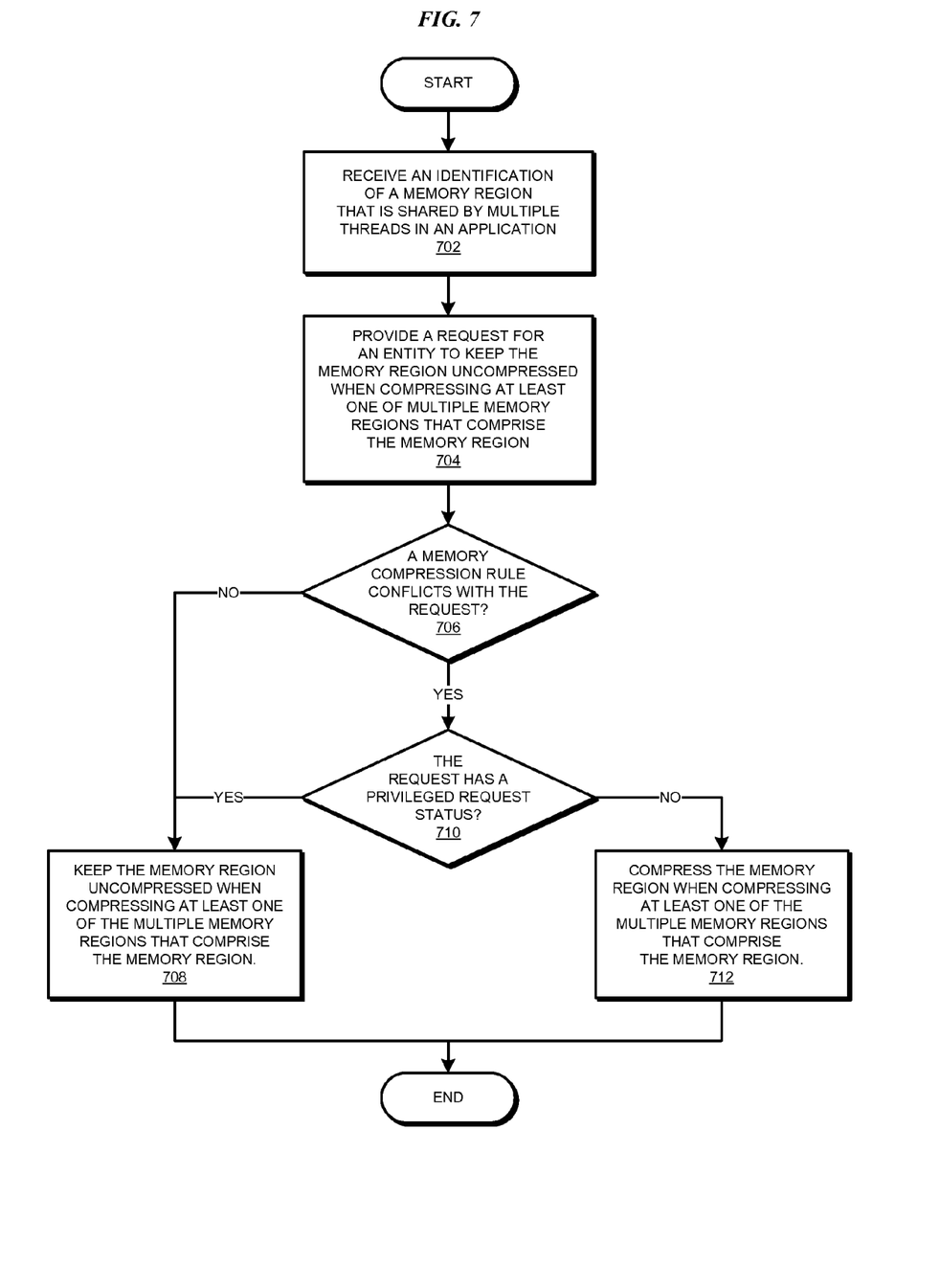
FIG. 7 depicts a flowchart of an example process for selective memory compression for multi-threaded applications in accordance with an illustrative embodiment.

With reference to FIG. 7, this figure depicts a flowchart of an example process 700 for selective memory compression for multi-threaded application in accordance with an illustrative embodiment. Process 700 may be implemented, for example, in hardware device 624 in FIG. 6, hypervisor 528 in FIG. 5, operating system 426 in FIG. 4, or application program interface 330 in FIG. 3.

Process 700 begins by receiving an identification of a memory region that is shared by multiple threads in an application (step 702). The identification may be received via an application program interface, a mutually accessible memory location, a hypervisor, a hardware device for compressing data in memory, or a combination thereof.

Process 700 provides a request for an entity to keep the identified memory region uncompressed when compressing at least one of multiple memory regions that include the identified memory region (step 704). For example, the entity may be an operating system, a hypervisor, or a hardware device for compressing data in memory.

Process 700 may optionally determine whether a memory compression rule conflicts with the request to keep the identified memory region uncompressed when compressing at least one of multiple memory regions that include the identified memory region (step 706). The determination of step 706 may be made by another process in an operating system, a hypervisor, or a hardware device for compressing data in memory within the scope of the invention.

If process 700 determines that the memory compression rule does not conflict with the request to keep the identified memory region uncompressed when compressing at least one of multiple memory regions that include the identified memory region ("No" path of step 706), process 700 keeps the identified memory region uncompressed when compressing at least one of multiple memory regions that include the identified memory region (step 708). The compressing of data in memory may be performed in any manner suitable to a particular implementation, such as by an operating system, a hypervisor, or a hardware device for compressing data in memory. Process 700 ends thereafter.

If process 700 determines that one or more memory compression rules conflicts with the request to keep the identified memory region uncompressed when compressing at least one of multiple memory regions that include the identified memory region ("Yes" path of step 706), process 700 may optionally determine whether the request to keep the identified memory region uncompressed when compressing at least one of multiple regions that include the identified memory region has a privileged request status (step 710). The determination may also be made by another process in an operating system, a hypervisor, or a hardware device for compressing data in memory.

If the request to keep the identified memory region uncompressed when compressing at least one of multiple regions that include the identified memory region has a privileged request status ("Yes" path of step 710), process 700 keeps the identified memory region uncompressed when compressing at least one of multiple memory regions that include the identified memory region (step 708). The compressing of data in memory may be by an operating system, a hypervisor, or a hardware device for compressing data in memory. Process 700 ends thereafter.

If the request to keep the identified memory region uncompressed when compressing at least one of multiple regions that include the identified memory region does not have a privileged request status ("No" path of step 710), process 700 compresses the identified memory region when compressing at least one of the multiple memory regions that include the identified memory region (step 712). The compressing of data in memory may be by performed in any suitable manner, such as by an operating system, a hypervisor, or a hardware device for compressing data in memory. Process 700 ends thereafter.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for selective memory compression. Using an embodiment of the invention, memory may be selectively compressed based on the memory usage of threads in an application. Illustrative embodiments of the invention identify memory regions that are shared by multiple threads in an application and request that such identified memory regions are kept uncompressed when memory regions are selected for compression.

Identification of memory regions that are shared by multiple threads in an application may be conveyed from the application to an application program interface as a request that such identified memory regions are kept uncompressed when memory regions are selected for compression. In an embodiment, the identification may be conveyed from the application to a mutually accessible memory location that is monitored by the operating system, which may handle receipt of this information as a request that such identified memory regions are kept uncompressed when memory regions are selected for compression.

In an embodiment, the identification may be conveyed from the application to a hypervisor that may handle receipt of such information as a request that such identified memory regions are kept uncompressed when memory regions are selected for compression. In an embodiment, the identification may be conveyed from the application to a hardware device that compresses data in memory, such that the hardware device may handle receipt of such information as a request that such identified memory regions are kept uncompressed when memory regions are selected for compression.

Such a request may be handled as a low priority request that may be overridden by a conflicting memory compression rule that selects the identified memory region for compression. Alternatively, such a request may be handled as a high priority or privileged request that may override a conflicting memory compression rule that selects the identified memory region for compression. Illustrative embodiments of the invention may reduce contention issues experienced by incidental compression of shared data that is important to multiple threads.

Although the embodiments are described using examples of data processing systems and devices or components of data processing systems, such examples are not limiting on the invention. An embodiment may be implemented in any device capable of storing data, and in any system where such device may be used within the scope of the invention. Some examples of other types of devices within the scope of the invention may be controller modules, sensors, and other electromechanical components. Such devices may be usable in conjunction with automobiles, engineering equipment, machinery, or tools within the scope of the invention.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for selective memory compression for multi-threaded applications, the computer implemented method comprising:
    receiving, at a first entity in a data processing system, an identification of a memory region that is shared by a plurality of threads in an application; and
    providing, from the first entity to a second entity in the data processing system, a request for the second entity to keep the memory region uncompressed when compressing at least one of a plurality of memory regions that comprise the memory region.

2. The computer implemented method of claim 1, further comprising:
    determining whether a memory compression rule conflicts with the request; and
    keeping the memory region uncompressed when compressing at least one of the plurality of memory regions that comprise the memory region in response to a determination that the memory compression rule does not conflict with the request.

3. The computer implemented method of claim 2, further comprising:
    determining whether the request has a privileged request status in response to a determination that the memory compression rule conflicts with the request;
    keeping the memory region uncompressed when compressing at least one of the plurality of memory regions that comprise the memory region in response to a determination that the request has the privileged request status;

compressing the memory region when compressing at least one of the plurality of memory regions that comprise the memory region in response to a determination that the request does not have the privileged request status.

4. The computer implemented method of claim 3, wherein the determining, the keeping, and the compressing are performed by the second entity.

5. The computer implemented method of claim 1, wherein providing the identification of the memory region is via an application program interface.

6. The computer implemented method of claim 1, wherein providing the identification of the memory region is performed via writing the identification of the memory region to a memory location that is accessible by the application and the second entity.

7. The computer implemented method of claim 1, wherein the second entity comprises at least one of an operating system and a hypervisor.

8. The computer implemented method of claim 1, wherein the second entity comprises a hardware device that compresses at least one of the other memory region and the memory region.

9. A computer usable program product comprising a computer usable storage device including computer usable code for selective memory compression for multi-threaded applications, the computer usable code comprising:
    computer usable code for receiving, at a first entity in a data processing system, an identification of a memory region that is shared by a plurality of threads in an application; and
    computer usable code for providing, from the first entity to a second entity in the data processing system, a request for the second entity to keep the memory region uncompressed when compressing at least one of a plurality of memory regions that comprise the memory region.

10. The computer usable program product of claim 9, further comprising:
    computer usable code for determining whether a memory compression rule conflicts with the request; and
    computer usable code for keeping the memory region uncompressed when compressing at least one of the plurality of memory regions that comprise the memory region in response to a determination that the memory compression rule does not conflict with the request.

11. The computer usable program product of claim 10, further comprising:
    computer usable code for determining whether the request has a privileged request status in response to a determination that the memory compression rule conflicts with the request;
    computer usable code for keeping the memory region uncompressed when compressing at least one of the plurality of memory regions that comprise the memory region in response to a determination that the request has the privileged request status;
    computer usable code for compressing the memory region when compressing at least one of the plurality of memory regions that comprise the memory region in response to a determination that the request does not have the privileged request status.

12. The computer usable program product of claim 11, wherein the determining, the keeping, and the compressing are performed by the second entity.

13. The computer usable program product of claim 9, wherein providing the identification of the memory region is via an application program interface.

14. The computer usable program product of claim 9, wherein providing the identification of the memory region is performed via writing the identification of the memory region to a memory location that is accessible by the application and the second entity.

15. The computer usable program product of claim 9, wherein the second entity comprises at least one of an operating system and a hypervisor.

16. The computer usable program product of claim 9, wherein the second entity comprises a hardware device that compresses at least one of the other memory region and the memory region.

17. The computer usable program product of claim 9, wherein the computer usable code is stored in a computer readable storage medium in a data processing system, and wherein the computer usable code is transferred over a network from a remote data processing system.

18. The computer usable program product of claim 9, wherein the computer usable code is stored in a computer readable storage medium in a server data processing system, and wherein the computer usable code is downloaded over a network to a remote data processing system for use in a computer readable storage medium associated with the remote data processing system.

19. A data processing system for selective memory compression for multi-threaded applications, the data processing system comprising:
    a storage device including a storage medium, wherein the storage device stores computer usable program code; and
    a processor, wherein the processor executes the computer usable program code, and wherein the computer usable program code comprises:
        computer usable code for receiving, at a first entity in a data processing system, an identification of a memory region that is shared by a plurality of threads in an application; and
        computer usable code for providing, from the first entity to a second entity in the data processing system, a request for the second entity to keep the memory region uncompressed when compressing at least one of a plurality of memory regions that comprise the memory region.

20. The data processing system of claim 19, wherein providing the request is via an application program interface, and the second entity comprises an operating system.

* * * * *